United States Patent
Quadri et al.

(10) Patent No.: US 10,401,013 B2
(45) Date of Patent: Sep. 3, 2019

(54) STAGE LIGHT FIXTURE AND METHOD FOR OPERATING SAID STAGE LIGHT FIXTURE

(71) Applicant: CLAY PAKY S.P.A., Seriate (IT)

(72) Inventors: Pasquale Quadri, Torre de'Roveri (IT); Carlo Venturati, Cividate al Piano (IT)

(73) Assignee: CLAY PAKY S.P.A., Seriate (IT)

( * ) Notice: Subject to any disclaimer, the term of this patent is extended or adjusted under 35 U.S.C. 154(b) by 409 days.

(21) Appl. No.: 14/818,998

(22) Filed: Aug. 5, 2015

(65) Prior Publication Data
US 2016/0040866 A1 Feb. 11, 2016

(30) Foreign Application Priority Data

Aug. 8, 2014 (IT) .............................. MI2014A1481

(51) Int. Cl.
| | | |
|---|---|---|
| *F21V 29/61* | (2015.01) | |
| *F21V 29/67* | (2015.01) | |
| *G03B 21/16* | (2006.01) | |
| *F21W 131/406* | (2006.01) | |

(52) U.S. Cl.
CPC .............. *F21V 29/61* (2015.01); *F21V 29/67* (2015.01); *F21W 2131/406* (2013.01); *G03B 21/16* (2013.01)

(58) Field of Classification Search
CPC .......... F21V 29/61; F21V 29/67; F21V 29/50; F21V 29/503; F21W 2131/406; G03B 21/16
See application file for complete search history.

(56) References Cited

U.S. PATENT DOCUMENTS

| | | | | |
|---|---|---|---|---|
| 4,701,833 A | * | 10/1987 | Bornhorst ............... | F21V 21/30 362/294 |
| 6,635,999 B2 | * | 10/2003 | Belliveau ........... | H05B 41/2928 315/149 |
| 7,789,541 B2 | * | 9/2010 | Meng .................. | F21V 23/0442 315/112 |
| 8,057,048 B2 | * | 11/2011 | Suzuki ................... | G03B 21/16 348/335 |
| 8,408,755 B2 | * | 4/2013 | Quadri .................... | F21V 11/10 362/281 |
| 9,995,996 B2 | * | 6/2018 | Masuda ................. | G03B 21/16 |
| 2002/0195953 A1 | | 12/2002 | Belliveau | |

(Continued)

FOREIGN PATENT DOCUMENTS

| | | |
|---|---|---|
| EP | 1 384 943 | 1/2004 |
| JP | 2010 103018 | 5/2010 |

(Continued)

*Primary Examiner* — Anh T Mai
*Assistant Examiner* — Arman B Fallahkhair
(74) *Attorney, Agent, or Firm* — Leason Ellis LLP (57) ABSTRACT

A stage light fixture is provided with:
a casing;
a light source, arranged inside the casing and adapted to emit a light beam along an optical axis;
a cooling assembly configured to cool the interior of the casing;
a monitoring assembly configured to monitor at least one parameter indicative of the operative conditions of the light fixture;
a control device configured to regulate the cooling assembly according to at least one indicative parameter monitored by the monitoring assembly.

24 Claims, 4 Drawing Sheets

(56) References Cited

U.S. PATENT DOCUMENTS

2007/0236668 A1* 10/2007 Suzuki ................... G03B 21/16
                                                                353/57
2011/0249443 A1* 10/2011 Jurik ......................... F21V 3/02
                                                               362/294
2013/0223078 A1     8/2013 Quadri et al.

FOREIGN PATENT DOCUMENTS

JP            5320548 B2 * 10/2013
WO    WO 2006/119582      11/2006

* cited by examiner

STAGE LIGHT FIXTURE AND METHOD FOR OPERATING SAID STAGE LIGHT FIXTURE

CROSS-REFERENCE TO RELATED PATENT APPLICATIONS

The present application claims the benefit of priority under 35 U.S.C. § 119 of Italian patent application serial No. MI2014A001481, filed Aug. 8, 2014, which is hereby incorporated by reference in its entirety.

The present invention relates to a stage light fixture and to a method for operating a stage light fixture.

BACKGROUND OF THE INVENTION

The stage light fixtures of known type comprise at least one light source configured to generate a light beam and a plurality of light beam processing elements configured to selectively process the light beam in accordance with the stage requirements.

The light source and the light beam processing elements are generally housed in a casing and generate heat inside the casing.

The heat accumulated inside the casing can overheat the light source and the remaining components of the light fixture with the risk of permanent damage. For these reasons, the majority of stage light fixtures comprise a cooling device capable of removing the heat generated inside the casing. However, the cooling devices normally used are not always able to properly cool the inside of the casing. Sometimes, in fact, there is an insufficient cooling or an excessive cooling with irreparable consequences which mostly determine a reduction of the duration of the light source or even the breakage of the light source.

SUMMARY OF THE INVENTION

It is therefore an object of this invention to provide a light fixture that is free from the aforesaid prior art drawbacks. In particular, it is an object of the present invention to provide a reliable and highly durable stage light fixture, wherein the components arranged inside the casing are properly cooled.

In accordance with these objects, the present invention relates to a stage light fixture according to claim 1.

In the light fixture according to the present invention, the cooling assembly is regulated according to the operative conditions of the light fixture monitored by the monitoring assembly. This guarantees an optimal cooling of the casing interior.

It is also an object of the present invention to provide a method to operate a stage light fixture that it is able to make the light fixture reliable and ensures a proper cooling of the components arranged inside the light fixture casing.

In accordance with these objects, the present invention relates to a method to operate a stage light fixture according to claim 16.

BRIEF DESCRIPTION OF THE DRAWINGS

Further characteristics and advantages of the present invention will become clear from the following description of a not limiting embodiment, with reference to the figures of the accompanying drawings, in which.

DETAILED DESCRIPTION OF THE INVENTION

Figure 1:
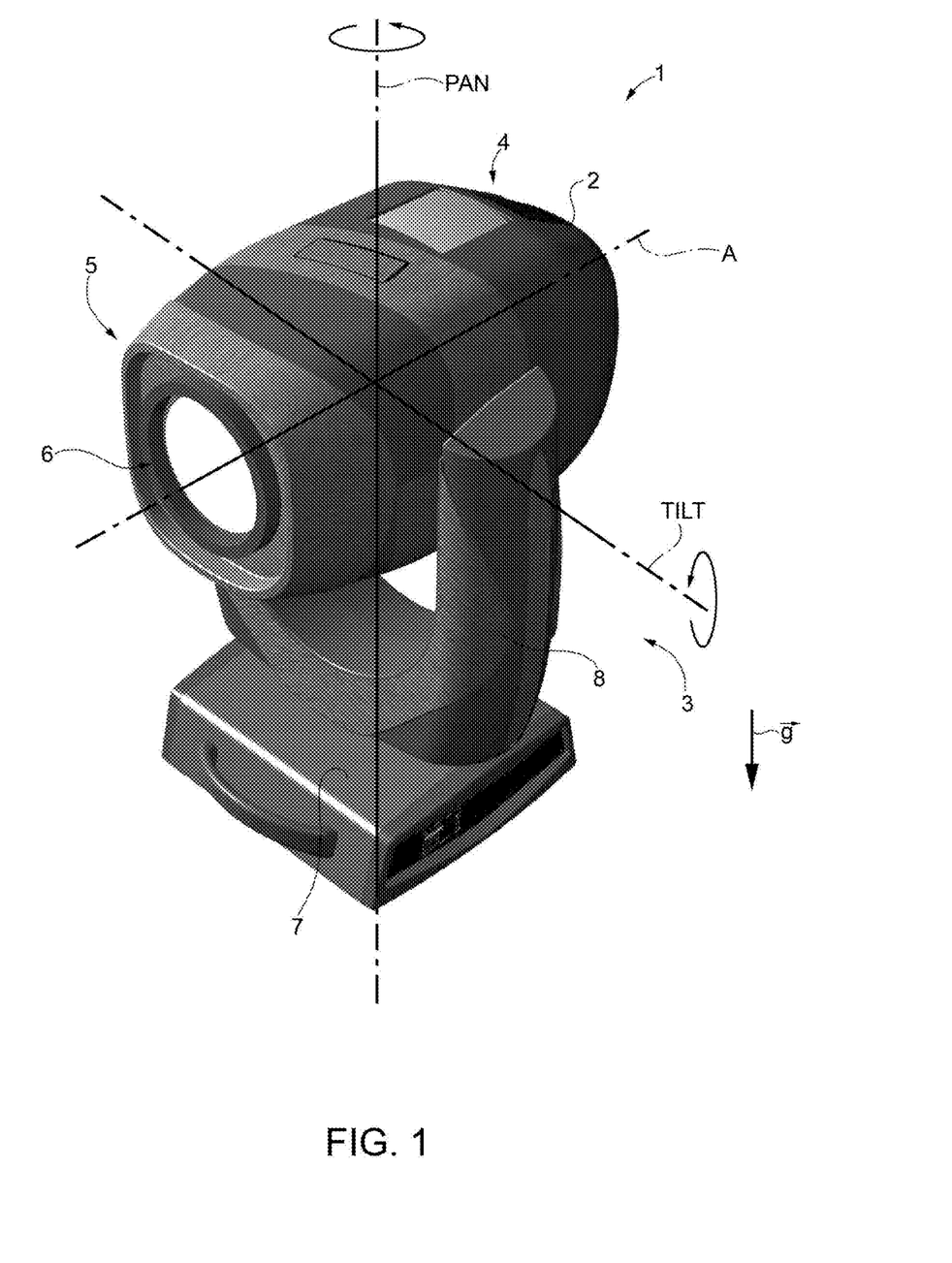
FIG. 1 is a perspective view of a stage light fixture according to the present invention

In FIG. 1 the reference number 1 indicates a stage light fixture comprising a casing 2 and the supporting means 3 configured to support and move the casing 2.

The casing 2 extends along a longitudinal axis A and is provided with a first closed end 4 and a second end 5, opposite to the first closed end 4 along the axis A, and having a projecting mouth 6. In the non-limiting example described and illustrated herein, the projecting mouth 6 has a substantially circular section.

The supporting means 3 are configured to allow the casing 2 to rotate around two orthogonal axes, commonly said PAN and TILT. In particular, the supporting means 3 comprise a base 7, to which a fork 8 is coupled in a rotatable manner around the axis PAN. The fork 8 supports the casing 2 in a rotatable manner around the axis TILT.

The actuation of the supporting means 3 is regulated by a movement control device (not visible in the attached figures). The movement control device can also be remotely controlled, preferably by communicating with a DMX protocol.

Figure 2:
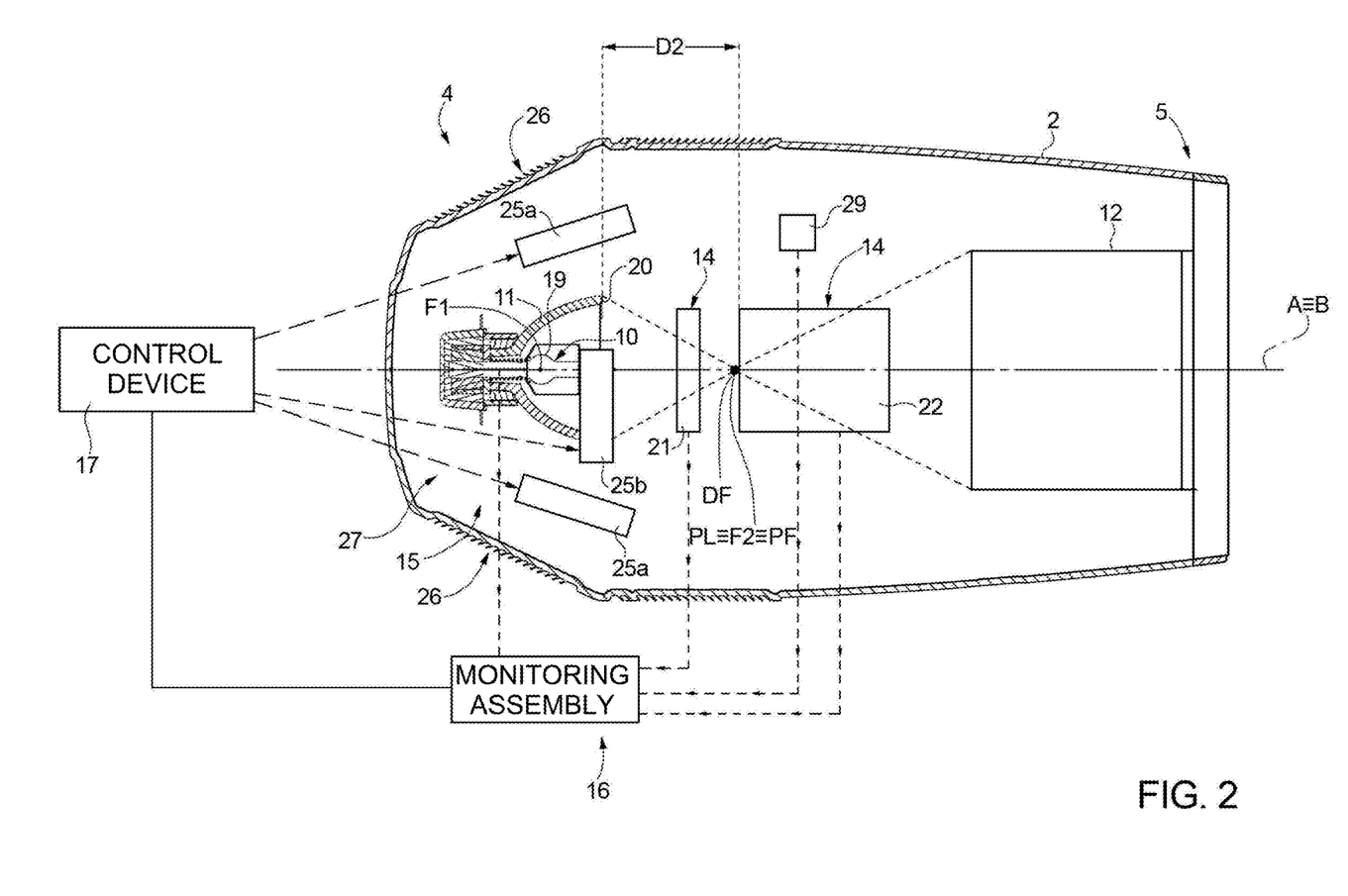
FIG. 2 is a schematic side view, with parts in section and parts removed for clarity's sake, of a detail of the stage light fixture of FIG. 1.

With reference to FIG. 2, the light fixture 1 also comprises a frame 9 coupled to the casing 2 (not shown for simplicity's sake in FIG. 2 and partially visible in FIG. 3), a light source 10, a reflector 11, an optical unit 12 (schematically shown in FIG. 2), beam processing elements (schematically shown in FIG. 2), a cooling assembly 15, a monitoring assembly 16 and a control device 17.

Figure 3:
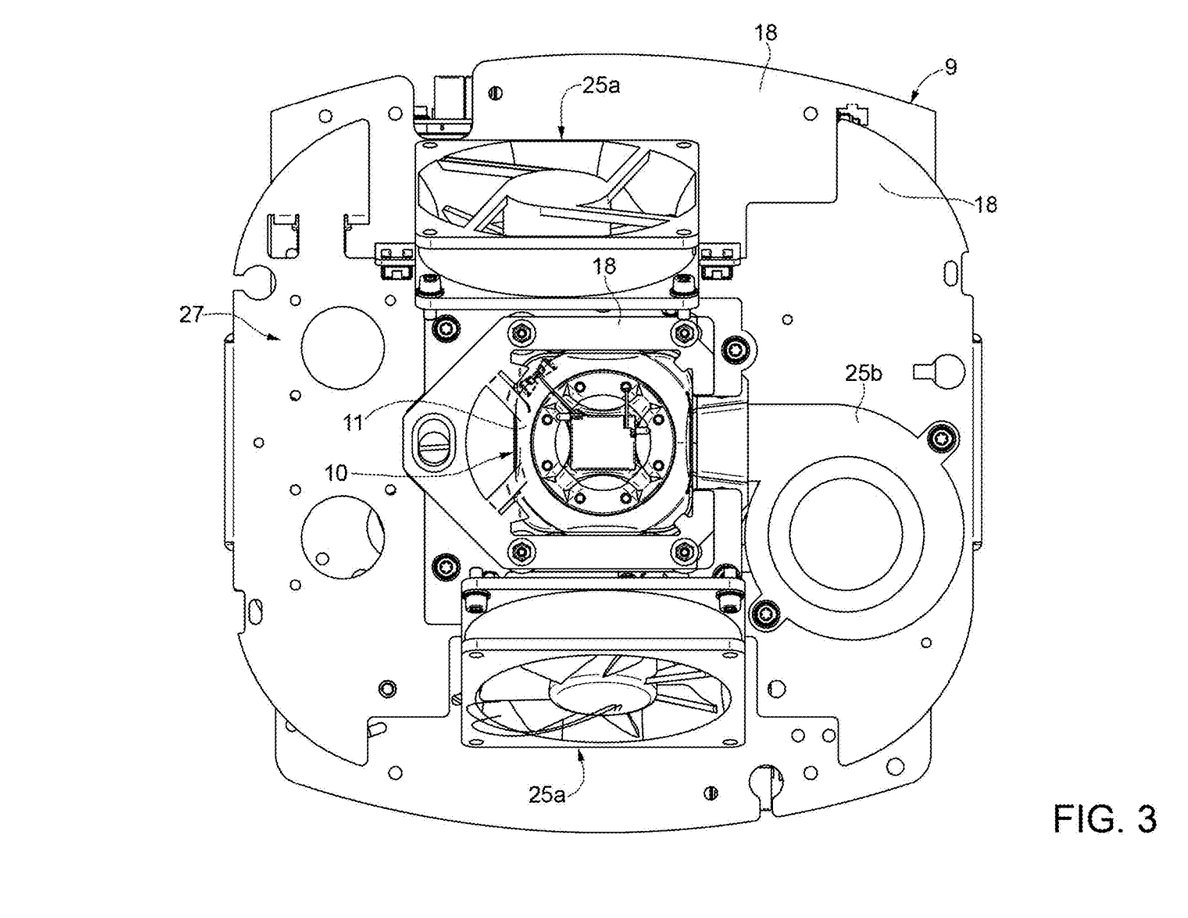
FIG. 3 is a rear view, with parts removed for clarity's sake, of a second detail of the stage light fixture of FIG. 1.

The frame 9 is integral with the casing 2 and comprises a plurality of elements coupled to each other and configured to define a support structure for the components arranged inside the casing 2, such as the light source 10, the reflector 11, the optical group 12, the beam processing means 14 and the cooling assembly 15. FIG. 3 partially shows some elements 18 configured to support the light source, the reflector and the cooling assembly.

The light source 10 is arranged inside the casing 2 at the closed end 4 of the casing 2, is supported by the frame 9, and is adapted to emit a light beam substantially along an optical axis B.

In the non-limiting example described and illustrated herein, the optical axis B coincides with the longitudinal axis A of the casing 2.

The light source 10 is preferably a discharge lamp comprising a bulb 19, generally in glass or quartz, containing mercury and halides.

The lamp is preferably a short arc lamp comprising, inside the bulb 19, two electrodes connected to a power supply circuit (not visible in the attached figures) and arranged at a determined distance from each other.

The distance between the electrodes is less than approximately 2 mm. In the non-limiting example described and illustrated herein, the distance is about 1.3 mm.

In the non-limiting example described and illustrated herein, the short arc lamp 10 has a power greater than about 450 watts.

The power supply P of the light source is regulated by a light source control device (not visible in the attached figures). The light source control device can also be remotely managed, preferably by communicating with a DMX protocol.

The reflector 11 is a preferably elliptical reflector, coupled to the light source 10 and provided with an outer edge 20.

In particular, the reflector 11 is coupled to the light source 10 so as to concentrate the light beam rays substantially in an operating point PL arranged at a distance D2 from the outer edge 20 of the reflector 11.

In particular, the reflector 11, being elliptical, is provided with two foci F1 and F2. Preferably, the light source 10 is arranged in a first focus F1 of the reflector 11 in such a way that the rays emitted by the light source are reflected and focused in the second focus F2 of the reflector 11. The second focus F2 defines the operating point PL arranged at the distance D2 from the outer edge 20 of the reflector 11.

In the non-limiting example described and illustrated herein, the distance D2 is equal to 36 mm approximately.

The light beam reflected by the reflector 11 and focused at the operating point PL is substantially dot-shaped and has a diameter DF which can reach, at most, 1 mm.

Preferably, in the operating point PL the light beam has a diameter DF of 0.8 mm.

Substantially, the light beam rays generate in the operating point PL a very concentrated and substantially dot-shaped beam.

The optical unit 12 is arranged at the open end 5 of the casing 2 so as to be centred on the optical axis B and to close the casing 2.

The optical unit 12 is an optical output, arranged in the most downstream point along the optical axis B, so as to be the last unit adapted to process the intercepted light beam.

The optical unit 12 has a focus point PF arranged between the light source 10 and the optical unit 12.

Preferably, the focus point PF coincides with the operating point PL. In this way, the optical unit 12 is able to capture and focus the focused beam in the operating point PL. The light beam outgoing from the optical unit 12 will therefore be very intense and concentrated.

The optical unit 12 includes one or more lenses (not illustrated in the attached figures) arranged and configured so that the optical unit 12 has a positive refractive power.

Preferably, the optical unit 12 is movable along the optical axis B to regulate the focus of the projected image. In particular, the optical unit 12 is movable along the optical axis B between a first operating position and a second operating position.

Preferably, the optical unit 12 comprises a support frame coupled to a carriage movable along the optical axis B (not shown for simplicity's sake), whose movement is regulated by an auto focus device (known and therefore not illustrated).

The optical unit 12 is characterized by a focal length LF able to substantially reduce to zero the ratio DF/LF. DF is the diameter of the light beam, focused and reflected in the focus point PF, and LF is the focal length (also called focal distance, or, more simply, focal length) of the optical unit 12 and is defined by the distance in mm between the centre of the optical unit 12 (also called nodal point) and the focus point PF of the optical unit 12.

In this way, the exit angle of the light beam emitted by the light fixture 1 will have substantially parallel rays or, at most, rays having a minimum deviation angle.

For example, in the here described and illustrated non-limitative case in which the diameter of the lenses of the optical unit 12 is equal to 170 mm, the focal length LF is equal to 170 mm, the diameter of the light beam focused and reflected in the focal point PF is 0.8 mm, and the beam deviation angle at a projection distance of 100 meters is approximately equal to 0.2°.

The light beam processing means 14 comprise a plurality of light beam processing elements supported by the frame 9 and configured to process the light beam generated by the light source 10 so as to obtain particular effects. In particular, the beam processing elements are supported and/or configured to selectively intercept the light beam to change the light beam only when necessary. In other words, the beam processing elements may intercept the beam to change its properties only where necessary.

The position of each beam processing element is regulated by a control device of the beam processing means (not visible in the attached figures). The control device of the beam processing elements can also be remotely managed, preferably by communicating with a DMX protocol.

The light beam processing means 14 comprise, preferably in sequence, at least a dimmer, a colour unit, a first gobos device, a rainbow device, a second gobos device, a frost unit and a prismatic element. It is clear that the light beam processing means 14 can include further beam processing elements not listed here.

In the non-limiting example described and illustrated herein, the light beam processing means 14 are divided into a first group 21 of light beam processing elements arranged between the light source 10 and the operating point PL, and a second group 22 of light beam processing elements arranged between the operating point PL and the optical unit 12.

The first group 21 comprises at least the dimmer and the colour group, the second group 22 comprises the first gobos device, preferably arranged at the operating point PL, the rainbow device, the second gobos device, the frost unit and the prismatic element.

The cooling assembly 15 comprises a plurality of cooling fans (schematically represented in FIG. 2), variously arranged inside the casing 2, supported by the frame 9 and regulated by the control device 17.

In the non-limiting example described and illustrated herein, the cooling fans 25 are three.

With reference to FIG. 2 and to FIG. 3, the cooling assembly 15 includes two cooling fans 25a close to a respective air inlet 26 formed along the wall of the casing 2 and a cooling fan 25b supporting the light source 10.

The cooling fans 25a are symmetrical with respect to the longitudinal axis A of the casing 2 and are configured as follows, namely the one for conveying the air drawn from the respective air intake 26 in the area 27 of the casing 2 between the end 4 the casing 2 and the outer portion of the reflector 11, and the other to facilitate the escape of air through the respective air intake 26 by favouring the turnover of the cooling air and by maximizing the cooling effect.

The cooling fan 25b is arranged and shaped so as to convey the air taken from the area 27 comprised between the end 4 of the casing 2 and the outer portion of the reflector 11 inside the reflector 11 so as to cool the light source 10, and in particular the bulb 19 of the light source 10.

As described in more detail below, the operation of the plurality of cooling fans 25 is regulated by the control device 17. In particular, the control device 17 regulates the rotating speed of the fans of the plurality of fans 25.

The monitoring assembly 16 is configured to monitor the operative conditions of the light fixture 1.

In particular, the monitoring assembly 16 is configured to detect operating parameters of the light fixture 1.

In the non-limiting example described and illustrated herein, the monitoring assembly 16 is configured to monitor the orientation of the casing 2, the power supply P of the light source 10, the type and location of the beam processing elements 14. It is clear that the monitoring assembly 16 can also monitor additional parameters to determine the operative conditions in which the light fixture 1 is located, such as e.g. the temperature of any heat filter arranged between the light source 10 and the light beam processing means 14, or the temperature inside the casing 2, etc.

In the non-limiting example described and illustrated herein, the monitoring device comprises a position sensor 29 configured to detect the position of the casing 2 with respect to the acceleration of gravity vector $\vec{g}$.

According to an embodiment not shown, the monitoring of the orientation of the casing 2 is carried out by monitoring the control data relating to the PAN and TILT rotation axis of the movement control device, previously described and not illustrated in the attached figures, and by arranging a position sensor in the base 7 to detect the orientation of the base 11 with respect to the acceleration of gravity vector $\vec{g}$ at least when the light fixture 1 is turned on.

According to a further embodiment not shown, the monitoring of the orientation of the casing 2 is carried out by monitoring the control data relating to the PAN and TILT rotation axis of the movement control device, and by arranging a position sensor in the casing 2 to detect the orientation of the base 11 with respect to the acceleration of gravity vector $\vec{g}$ at least when the light fixture 1 is turned on.

The position sensor 29 is firmly coupled to the frame 9 so as to detect the movement of the casing 2.

The position sensor 29 is configured to detect the inclination angle α of the casing 2 with respect to the acceleration of gravity vector $\vec{g}$, preferably also taking into account the direction of the light beam.

The position sensor 29 used in the non-limiting example described and illustrated herein is able to detect the position with respect to the axis of gravity along which the acceleration of gravity vector $\vec{g}$ acts. Therefore, the position sensor 29 detects as identical positions of the casing 2 symmetrical with respect to the axis of gravity.

Figure 4:
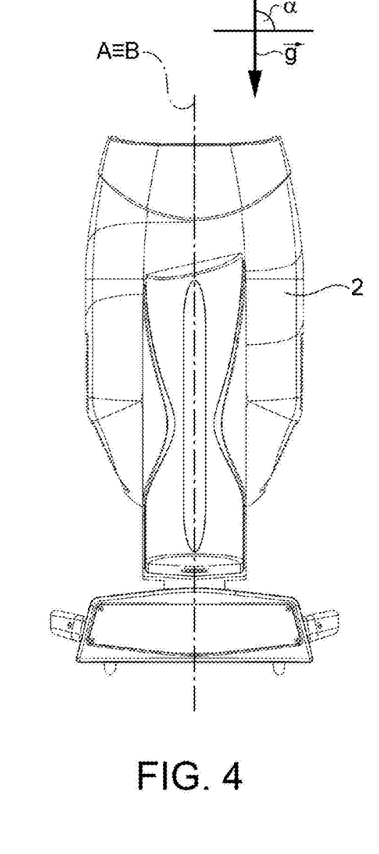
FIGS. 4, 5 and 6 are side views of the light fixture of FIG. 1 in different operating positions.
Figure 5:
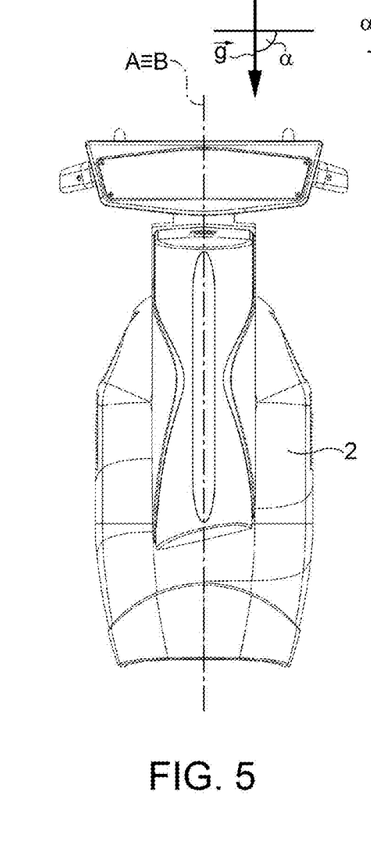

Preferably, the position sensor 29 is coupled to the casing 2 so as to detect an angle equal to zero when the casing is horizontally arranged and is configured to detect an inclination angle α equal to +90° when the casing 2 is arranged so as to project a vertical light beam from the bottom upwards (configuration of FIG. 4), and to detect an inclination angle α equal to −90° when the casing 2 is arranged so as to project a vertical light beam from the top downwards (configuration of FIG. 5).

It is clear that the initial reference position of the used sensor can also be different according to the type of sensor.

Preferably, the position sensor 29 is an accelerometer configured to detect the components of its acceleration along three axes, one of which is parallel to the optical axis B of the light beam, coincident with the longitudinal axis A of the casing 2 in the described example.

According to not shown embodiments, the position sensor 29 includes an inclinometer, one or more mercury contacts suitably arranged so as to detect the inclination of the element to which they are coupled, an accelerometer associated with a gyroscope, an accelerometer associated with a gyroscope and a magnetometer.

According to not shown embodiments, the position sensor 29 is also configured to detect data relating to the displacement speed of the casing 2.

For monitoring the power supply P of the light source 10, the monitoring assembly 16 receives data from the light source control device, while for monitoring the type and location of the beam processing elements, the monitoring assembly 16 receives the data from the control device of the light beam processing elements.

The data acquired by the monitoring device 16 are sent to the control device 17, which is configured to regulate the cooling assembly 15 on the basis of at least one of the parameters monitored by the monitoring assembly 16.

In the non-limiting example described and illustrated herein, the control device 17 is configured to regulate the cooling assembly 15 according to a data matrix experimentally obtained according to at least one of the following monitored parameters: position of the casing 2 with respect to the acceleration of gravity vector $\vec{g}$, moving speed of the casing 2, power supply P of the light source 10 and type and location of the beam processing elements.

According to an embodiment, the control device 17 is configured to regulate the cooling assembly 15 in accordance with a control function derived from experimental data or on the basis of a pre-set control function.

In particular, the control device 17 is configured to regulate the speed of at least a fan of the plurality of fans 25 in order to determine a variation of the rotating speed of the regulated fan.

In detail, the control device 17 is configured to determine a variation of the rotating speed of the fan regulated from a current speed value to a corrected speed value.

The transition from the current speed value to the corrected speed value may be gradual or stepwise.

In the non-limiting example described and illustrated herein, the control device 17 is configured to regulate the rotating speed of the fan to be regulated by means of the variation of the fan voltage, from a current voltage value to a corrected voltage value.

The current voltage value is the value of the current voltage of the regulated fan, while the corrected voltage value may be higher or lower than the current voltage value.

In the non-limiting example described and illustrated herein, the control device 17 is configured to regulate at least the voltage of the fan 25b.

Preferably, the control device 17 is configured to regulate the voltage of the fans 25a and of the fan 25b.

In particular, the control device 17 is configured to lower the voltage of at least a fan of the plurality of fans 25 to reduce the cooling action when the position of the casing 2 with respect to the acceleration of gravity vector $\vec{g}$ is equal to a value comprised in at least a critical interval of positions β for a period of time greater than a first threshold value.

The critical interval of positions β depends on the type of used light source 10, on the geometry of the light fixture 1 and on the type of used cooling assembly.

Figure 6:
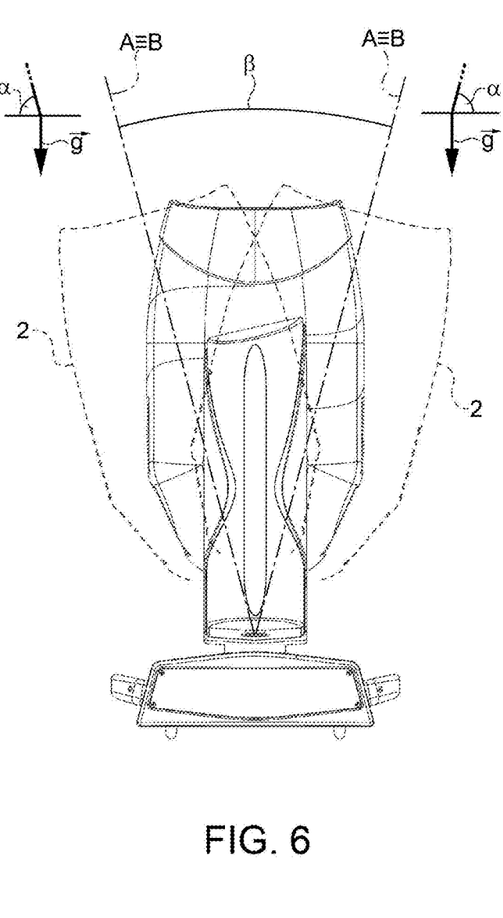

The critical interval of positions β is comprised between 50° and 90°, preferably between 60° and 90°, and is schematically illustrated in FIG. 6.

The first threshold value is preferably equal to 30 seconds.

The lowering of the voltage of at least a fan of the plurality of fans 25 performed by the control device 17 is preferably a stepwise lowering from a current voltage value, for example 24V or 16V, to a first corrected voltage value, for example 13V.

If the position sensor 29 detects a movement of the casing 2 for a period longer than a second threshold value, preferably equal to 30 seconds, after that the position of the casing 2 with respect to the acceleration of gravity vector $\vec{g}$ has remained equal to a value comprised in the critical interval of positions β for a period of time greater than the first threshold value, the control device 17 is configured to raise the voltage from the first corrected voltage value, for example 13V, to the rated voltage value, for example 24V or 16V, equal to the voltage before the correction.

If the position sensor 29 detects a position of the casing 2 other than a value in the critical interval of positions β for a period greater than the second threshold value, preferably equal to 30 seconds, after that the position of the casing 2 with respect to the acceleration of gravity vector $\vec{g}$ has remained the same at a value comprised in the critical interval of positions β for a period of time greater than the first threshold value, the control device 17 is configured to raise the voltage from the first corrected voltage value, for example 13V, to the rated voltage, for example 24V or 16V, equal to the voltage before the correction.

According to a not shown embodiment, the critical interval corresponds to a speed increase of at least a fan 25, instead of a decrease, and that out of the critical interval of positions there is a speed decrease of at least a fan 25.

According to a further embodiment, the fans 25a and 25b are regulated independently of each other on the basis of the position of the casing 2.

A further not shown embodiment defines a plurality of critical intervals of positions in correspondence of which there is a speed variation of the fans 25.

According to a further embodiment, the control system 17 varies the speed of the fans 25 according to a position variation of the casing 2.

In the non-limiting example described and illustrated herein, the control device 17 is also preferably configured to change the rotating speed of at least a fan of the plurality of fans 25 on the basis of the position of one of the beam processing elements, e.g. the dimmer.

In particular, the control device 17 is configured to determine a stepwise reduction of the rotating speed of the fan when the dimmer is operated so as to reduce the brightness of the light beam.

In the non-limiting example described and illustrated herein, the control device 17 is configured to regulate the rotating speed of the fan to be regulated by varying the voltage of the fan regulated by a current voltage value, for example 24V, to a second corrected voltage value, for example 16V, on the basis of the position of the dimmer.

If the dimmer is operated so as to reduce the brightness of the light beam and the position of the casing 2 with respect to the acceleration of gravity vector $\vec{g}$ has remained the same at a value comprised in the critical interval of positions β for a period of time greater than the first threshold value, the control device 17 lowers the voltage of the fan regulated by a current voltage value, equal to the value already lowered by the actuation of the dimmer (e.g., 16V), to a second corrected voltage value (for example 13V).

According to an embodiment not shown, the control device 17 is configured to change the rotating speed of at least a fan of the plurality of fans 25 on the basis of the moving speed of the casing 2.

Thanks to the regulation of the cooling assembly 15 carried out by the control device 17 according to the data monitored by the monitoring device 16 according to the present invention, the risk of damage to the components arranged inside the casing 2 due to overheating or excessive cooling is strongly lowered.

In the light fixture according to the present invention, in fact, the regulation of the cooling assembly 15 is carried out to ensure an appropriate cooling of the interior of the casing 2.

Thanks to the present invention it is possible to use lamps having a thermal behaviour dependent on the position of the lamps with respect to gravity, and which otherwise could not be used.

Finally, it is evident that the stage light fixture and the method for operating said stage light fixture described herein may be modified and varied without departing from the scope of the appended claims.

The invention claimed is:

1. Stage light fixture comprising:
a casing (2);
supporting means (3) configured to allow the casing (2) to rotate around two orthogonal axes
a light source (10), arranged inside the casing (2) and adapted to emit a light beam along an optical axis (B), the light source (10) being a discharge lamp comprising a bulb (19);
a reflector (11) coupled to the light source (10);
a plurality of light beam processing elements (14) supported and configured to selectively intercept the light beam;
a cooling assembly (15) configured to cool the interior of the casing (2), the cooling assembly (15) including at least one first fan (25a) and a second fan (25b);
a monitoring assembly (16) configured to monitor at least one indicative parameter of the operative conditions of the light fixture (1);
a control device (17) configured to regulate the cooling assembly (15) on the basis of at least the indicative parameter monitored by the monitoring assembly (16), the control device (17) being configured to regulate the rotating speed of at least the second fan (25b) of the cooling assembly (15) on the basis of at least the indicative parameter monitored by the monitoring assembly;
wherein the second fan (25b) is configured to convey the air taken from an area (27) comprised between an end (4) of the casing (2) and the outer portion of the reflector (11) so as to cool the light source (10) including the bulb (19);
wherein monitoring assembly (16) comprises a detector (29) configured to detect the position of the casing (2) with respect to the acceleration of gravity vector ($\vec{g}$), wherein the control device (17) is configured to change the rotating speed of the at least the second fan (25b) from a current speed value to a corrected speed value when the position of the casing (2) with respect to the acceleration of the gravity vector ($\vec{g}$) is comprised in a critical interval of positions (β);
wherein the at least one first fan (25a) is disposed outside of the reflector (11) and is configured to direct air toward the reflector (11);
wherein the second fan (25b) is positioned at least partially between the bulb (19) and the beam processing means (14) to move air directly around the light source (10) by, at least in part, directing air onto a forward portion of the bulb (19) that is located within an inner reflector space defined by the reflector (11);

wherein the rotating speed of at least the second fan (25*b*) is regulated on a basis of an orientation of the casing (2).

2. The Light fixture according to claim 1, wherein the control device (17) is configured to change the rotating speed of at least the second fan (25*b*) from a current speed value to a corrected speed value when the position of the casing (2) with respect to the acceleration of gravity vector ($\vec{g}$) is equal to a value comprised in the critical interval of positions (β) for a time period greater than a first threshold value.

3. The Light fixture according to claim 2, wherein the corrected speed value is smaller than the current speed value.

4. The Light fixture according to claim 2, wherein the corrected speed value is greater than the current speed value.

5. The Light fixture according to claim 2, wherein the control device (17) is configured to change the rotating speed of at least the second fan (25*b*) from the corrected speed value to a rated speed value if the detector detects a position of the casing (2) with respect to the acceleration of gravity vector ($\vec{g}$) other than a value within the critical interval of positions (β) for a time period greater than a second threshold value, wherein the rated speed value is greater than the corrected speed value.

6. The Light fixture according to claim 1, wherein the control device (17) is configured to regulate the voltage of at least the second fan (25*b*) of the cooling assembly (15) so as to cause a change of the rotating speed of at least the second fan (25*b*).

7. The Light fixture according to claim 1, wherein the detector (29) is an accelerometer.

8. The Light fixture according to claim 1, wherein the monitoring assembly (16) is configured to monitor the power of supply of the light source (10).

9. The Light fixture according to claim 1, wherein the monitoring assembly (16) is configured to monitor the type and the position of at least one light beam processing element (14).

10. The Light fixture according to claim 1, wherein the monitoring assembly (16) is configured to monitor a dimmer activation.

11. The Light fixture according to claim 1 wherein the control device (17) is configured to regulate the cooling assembly (15) according to a control function calculated from experimental data.

12. The Light fixture according to claim 1, wherein the detector is configured to detect an inclination angle α of the casing (2) with respect to the acceleration of gravity vector ($\vec{g}$) and in further view of a direction of the light beam.

13. The Light fixture according to claim 1, wherein the critical interval of positions (β) is between 50° and 90°.

14. Method for operating a stage light fixture (1) comprising the steps of:
cooling, using a cooling assembly (15), the interior of a casing (2) housing a light source (10) adapted to emit a light beam along an optical axis (B) with a plurality of light beam processing elements (14) supported and configured to selectively intercept the light beam, the light source being a discharge lamp comprising a bulb (19) and being coupled to a reflector (11), the casing (2) being supported by supporting means (3) that is configured to allow the casing (2) to rotate around two orthogonal axes, wherein the cooling assembly (15) includes at least one first fan (25*a*) and a second fan (25*b*);

monitoring at least one indicative parameter of the operative conditions of the light fixture (1);

regulating the cooling on the basis of at least one monitored indicative parameter, wherein the step of regulating the cooling comprises the step of regulating the rotating speed of at least the second fan (25*b*) of a cooling assembly (15) on the basis of at least the monitored indicative parameter, wherein the at least one first fan (25*a*) is disposed outside of the reflector (11) and is configured to direct air toward the reflector (11), wherein the second fan (25*b*) is positioned at least partially between the bulb (19) and the beam processing means (14) to move air directly around the light source (10) by, at least in part, directing air onto a forward portion of the bulb (19) that is located within an inner reflector space defined by the reflector (11);

wherein the step of monitoring the at least one indicative parameter of the operative conditions of the light fixture (1) comprises the step of detecting the position of the casing (2) with respect to the acceleration of gravity vector ($\vec{g}$); and wherein the step of regulating the cooling comprises the step of changing the rotating speed of the at least the second fan (25*b*) from a current speed value to a corrected speed value when the position of the casing (2) with respect to the acceleration of the gravity vector ($\vec{g}$) is comprised in a critical interval (β) due to an orientation of the casing (2), wherein the second at least one fan (25, 25*a*, 25*b*) is configured to convey air taken from an area (27) comprised between an end (4) of the casing (2) and the outer portion of the reflector (11) so as to cool the light source (10) including the bulb (19).

15. The Method according to claim 14, wherein the step of regulating the cooling comprises the step of changing the rotating speed of at least the second fan (25*b*) from a current speed value to a corrected speed value when the position of the casing (2) with respect to the acceleration of gravity vector ($\vec{g}$) is equal to a value comprised in the critical interval of positions (β) for a time period greater than a first threshold value.

16. The Method according to claim 15, wherein the step of regulating the cooling comprises the step of changing the rotating speed of at least the second fan (25*b*) from the corrected speed value to a rated speed value if a detector detects a position of the casing (2) with respect to the acceleration of gravity vector ($\vec{g}$) other than a value in the critical interval of positions (β) for a time period greater than a second threshold value, wherein the rated speed value is greater than the corrected speed value.

17. The Method according to claim 14, wherein the step of regulating the rotating speed of at least the second fan (25*b*) comprises the step of regulating the voltage of the second fan (25*b*).

18. The Method according to claim 14, wherein the step of monitoring at least one indicative parameter of the operative conditions of the light fixture (1) comprises the step of monitoring the power supply of the light source (10).

19. The Method according to claim 14, wherein the step of monitoring at least one indicative parameter of the operative conditions of the light fixture (1) comprises the step of monitoring the type and the position of at least one light beam processing element (14) supported and configured to selectively intercept the light beam.

20. The Method according to claim 14, wherein the step of monitoring at least one indicative parameter of the operative conditions of the light fixture (1) comprises the step of monitoring a dimmer activation.

21. The Method according to claim 14, wherein the step of regulating the cooling is carried out according to a control function calculated from experimental data.

22. The Method according to claim 14, wherein the step of detecting the position of the casing (2) with respect to the acceleration of gravity vector ($\vec{g}$) is performed by a detector that is configured to detect an inclination angle α of the casing (2) with respect to the acceleration of gravity vector ($\vec{g}$) and in further view of a direction of the light beam.

23. The Method according to claim 14, wherein the critical interval of positions (β) is between 50° and 90°.

24. Stage light fixture comprising:
a casing (2);
supporting means (3) configured to allow the casing (2) to rotate around two orthogonal axes
a light source (10), arranged inside the casing (2) and adapted to emit a light beam along an optical axis (B), the light source (10) being a discharge lamp comprising a bulb (19);
a reflector (11) coupled to the light source (10);
a plurality of light beam processing elements (14) supported and configured to selectively intercept the light beam;
a cooling assembly (15) configured to cool the interior of the casing (2), the cooling assembly (15) including at least one first fan (25a) and a second fan (25b);
a monitoring assembly (16) configured to monitor at least one indicative parameter of the operative conditions of the light fixture (1); and
a control device (17) configured to regulate the cooling assembly (15) on the basis of at least the indicative parameter monitored by the monitoring assembly (16), the control device (17) being configured to regulate the rotating speed of the at least one first fan (25a) and the second fan (25b) of the cooling assembly (15) on the basis of at least the indicative parameter monitored by the monitoring assembly;

wherein the second fan (25b) is configured to convey the air taken from an area (27) comprised between an end (4) of the casing (2) and the outer portion of the reflector (11) so as to cool the light source (10) including the bulb (19);

wherein monitoring assembly (16) comprises a detector (29) configured to detect the position of the casing (2) with respect to the acceleration of gravity vector ($\vec{g}$) wherein the control device (17) is configured to change the rotating speed of the at least one first fan (25a) and the second fan (25b) from a current speed value to a corrected speed value when the position of the casing (2) with respect to the acceleration of the gravity vector) ($\vec{g}$) is comprised in a critical interval of positions (β);

wherein the rotating speed of the at least one first fan (25a) and the second fan (25b) is regulated on a basis of an orientation of the casing (2);

wherein the at least one first fan (25a) and the second fan (25b) are regulated independently of each other on the basis of the position of the casing (2), wherein the at least one first fan is disposed outside of the reflector and is configured to direct air toward the reflector; and wherein the second fan is positioned at least partially between the bulb and the beam processing means to move air directly around the light source by, at least in part, directing air onto a forward portion of the bulb that is located within an inner reflector space defined by the reflector.

* * * * *